US012016086B2

(12) United States Patent
Mullin

(10) Patent No.: US 12,016,086 B2
(45) Date of Patent: Jun. 18, 2024

(54) CONTROL CIRCUIT FOR A VAPOR PROVISION SYSTEM

(71) Applicant: NICOVENTURES TRADING LIMITED, London (GB)

(72) Inventor: Martin Conrad Mullin, London (GB)

(73) Assignee: NICOVENTURES TRADING LIMITED, London (GB)

( * ) Notice: Subject to any disclaimer, the term of this patent is extended or adjusted under 35 U.S.C. 154(b) by 0 days.

(21) Appl. No.: 18/194,763

(22) Filed: Apr. 3, 2023

(65) Prior Publication Data

US 2023/0239967 A1 Jul. 27, 2023

Related U.S. Application Data

(63) Continuation of application No. 17/644,746, filed on Dec. 16, 2021, now Pat. No. 11,690,140, which is a continuation of application No. 16/327,114, filed as application No. PCT/GB2017/052343 on Aug. 9, 2017, now Pat. No. 11,259,366.

(30) Foreign Application Priority Data

Aug. 25, 2016 (GB) ...................................... 1614478

(51) Int. Cl.

*H05B 1/02* (2006.01)
*A24F 40/53* (2020.01)
*A24F 40/10* (2020.01)

(52) U.S. Cl.

CPC ........... *H05B 1/0244* (2013.01); *A24F 40/53* (2020.01); *H05B 1/0297* (2013.01); *A24F 40/10* (2020.01); *H05B 2203/035* (2013.01)

(58) Field of Classification Search

CPC .. A64M 11/042; A64M 11/044; A64M 15/06; A24F 40/10; A24F 40/53; A24F 40/20; A24F 40/30; A24F 40/50; A24F 40/60; H05B 1/0244; H05B 1/0297; H05B 2203/035

See application file for complete search history.

(56) References Cited

U.S. PATENT DOCUMENTS 5,613,505 A * 3/1997 Campbell .............. H05B 6/365 131/194
11,026,448 B2 * 6/2021 Leadley .................. A24F 40/65
2013/0220315 A1 * 8/2013 Conley ................... A24F 40/44 128/202.21
2014/0096781 A1 * 4/2014 Sears ...................... A24F 40/00 131/328

(Continued)

*Primary Examiner* — Marcus E Harcum

(74) *Attorney, Agent, or Firm* — BURR & FORMAN LLP

(57) ABSTRACT

A control circuit for a vapor provision system includes comprises a first controller with capability to control a first set of components in the vapor provision system; a second controller with capability to control a second set of components in the vapor provision system, at least one component in the second set being also in the first set; and a communication link between the first controller and the second controller by which at least one controller can monitor operation of the other controller; wherein one or both controllers is operable to, via the communication link, detect a fault with the capability of the other controller to control the at least one component and, in response, assume control of the at least one component.

15 Claims, 4 Drawing Sheets

(56) References Cited

U.S. PATENT DOCUMENTS

| | | | | |
|---|---|---|---|---|
| 2014/0096782 | A1* | 4/2014 | Ampolini | A24F 40/60 131/328 |
| 2014/0230835 | A1* | 8/2014 | Saliman | A24F 40/60 131/329 |
| 2014/0338685 | A1* | 11/2014 | Amir | H05B 1/0244 131/329 |
| 2015/0075545 | A1* | 3/2015 | Xiang | A24F 40/53 429/61 |
| 2015/0128976 | A1* | 5/2015 | Verleur | A61M 11/042 131/329 |
| 2015/0208731 | A1* | 7/2015 | Malamud | H05B 1/0244 131/328 |
| 2016/0106156 | A1* | 4/2016 | Qiu | H02J 7/00712 392/404 |
| 2016/0374397 | A1* | 12/2016 | Jordan | G01L 19/0092 131/329 |
| 2017/0042252 | A1* | 2/2017 | Takeuchi | A24F 40/53 |
| 2017/0082683 | A1* | 3/2017 | Krystad | G01R 31/2862 |
| 2017/0119052 | A1* | 5/2017 | Williams | H05B 3/44 |
| 2017/0215485 | A1* | 8/2017 | Zitzke | A61M 15/06 |
| 2017/0360097 | A1* | 12/2017 | Xiang | H05B 1/02 |
| 2018/0296777 | A1* | 10/2018 | Terry | A61M 11/042 |
| 2018/0352870 | A1* | 12/2018 | Qiu | A24F 40/60 |
| 2020/0229502 | A1* | 7/2020 | Akao | A24F 40/60 |
| 2021/0007404 | A1* | 1/2021 | Lee | A24F 40/53 |
| 2021/0134095 | A1* | 5/2021 | Milt | A24F 40/65 |
| 2021/0161211 | A1* | 6/2021 | Akao | H02J 7/007192 |

* cited by examiner

CONTROL CIRCUIT FOR A VAPOR PROVISION SYSTEM

PRIORITY CLAIM

The present application is Continuation of U.S. application Ser. No. 17/644,746, filed Dec. 16, 2021 which is a Continuation of U.S. application Ser. No. 16/327,114, filed Feb. 21, 2019, now U.S. Pat. No. 11,259,366, granted Feb. 22, 2022, which is a National Phase entry of PCT Application No. PCT/GB2017/052343, filed Aug. 9, 2017, which claims priority from GB Patent Application No. 1614478.4, filed Aug. 25, 2016, each of which are hereby fully incorporated herein by reference.

TECHNICAL FIELD

The present disclosure relates to control circuits for electronic vapor provision systems.

BACKGROUND

Vapor provision systems such as electronic or e-cigarettes generally contain a reservoir of a source liquid containing a formulation, typically including nicotine, from which an aerosol (vapor) is generated, such as through vaporization or other means. The system may have an aerosol source comprising a heating element or heater coupled to a portion of the source liquid from the reservoir. Electrical power is provided to the heater from a battery comprised within the vapor provision system, under the control of circuitry such as a microcontroller. The circuitry is configured to switch on the electrical power, perhaps in response to an event such as a user inhaling on the vapor provision system, whereupon the heater temperature rises, the portion of the source liquid is heated, and the vapor is generated for inhalation by the user. The circuitry is further configured to subsequently switch off the electrical power provided to the heater, for example after a certain time period or when the inhalation ceases. Vapor generation is thereby terminated.

However, if a fault arises by which the circuitry is unable to terminate the electrical power supply to the heater, the heater will continue to generate heat and the vapor provision system may reach an unsafe temperature. Other safety issues or otherwise undesirable operational conditions may similarly arise from faults in the control of other components in the vapor provision system.

Configurations which address the issue of unsafe or unwanted operational conditions in vapor provision systems are therefore of interest.

SUMMARY

According to a first aspect of certain embodiments described herein, there is provided a control circuit for a vapor provision system comprising: a first controller with capability to control a first set of components in the vapor provision system; a second controller with capability to control a second set of components in the vapor provision system, at least one component in the second set being also in the first set; and a communication link between the first controller and the second controller by which at least one controller can monitor operation of the other controller; wherein one or both controllers is operable to, via the communication link, detect a fault with the capability of the other controller to control the at least one component and, in response, assume control of the at least one component.

The at least one component may comprise an electrical heating element, and the capability to control the at least one component may comprise controlling provision of electrical power from a battery to the heating element. Accordingly, the fault may comprise an inability of the other controller to discontinue provision of electrical power to the heating element, and the operability of one or both controllers to assume control of the at least one component may comprise stopping the provision of electrical power to the heating element.

One or both controllers may be further configured to, in response to detecting a fault with the other controller, place the vapor provision system in an inoperable state. One or both controllers may be further operable to store information regarding a fault detected with the other controller.

The second set of components may comprise an electrical heating element only. In some examples, the first set of components and the second set of components may be the same. One or both controllers therefore may be further operable to, in response to detecting a fault with the other controller, assume control of all components in the first set and the second set. Alternatively, except for the at least one component, the first set of components may be different from the second set of components.

Monitoring operation of the other controller may comprise sending polling queries to that controller via the communication link, and detecting a fault may comprise noting an absence of a reply to a polling query or noting a reply to a polling query that reports a fault. Detecting a fault may comprise noting a fault reporting message received via the communication link.

At least one of the first controller and the second controller may comprise a microcontroller.

According to a second aspect of certain embodiments provided herein, there is provided a vapor provision system comprising a control circuit according to the first aspect.

According to a third aspect of certain embodiments provided herein, there is provided a control section for a vapor provision system, the control section housing a control circuit according to the first aspect, and a battery. The control section may be configured to be separably connectable with a cartomizer section, the cartomizer section and the control section together forming the vapor provision system.

According to a fourth aspect of certain embodiments provided herein, there is provided a method of controlling a component in a vapor provision system comprising: controlling the component using a first controller; monitoring operation of the first controller using a second controller for the purpose of detecting faults in the operation of the first controller, via a communication link between the first controller and the second controller; and in response to detection by the second controller of a fault in the operation of the first controller, transferring control of the component to the second controller.

The detected fault may be any fault in operation of the first controller. Alternatively, the detected fault may be a fault in an ability of the first controller to control the component. The method may further comprise, in response to detection of the fault, the second controller placing the vapor provision system in an inoperable state.

According to a fifth aspect of certain embodiments provided herein, there is provided control circuitry for an electronic cigarette having an electrical heating element, comprising: a first microcontroller; a second microcontroller; and a communication link between the first microcontroller and the second microcontroller; wherein each microcontroller is programmed to be able to control the electrical heating element, and at least the second microcontroller is programmed to monitor operation of the other microcontroller for faults using the communication link, and in response to finding a fault in an ability of the other microcontroller to control the electrical heating element when the other microcontroller is controlling the electrical heating element, take over control of the heating element.

According to a sixth aspect of certain embodiments provided herein, there is provided an electronic vapor provision system or part therefore comprising: an electrical heating element; a battery; a first microcontroller with capability to control delivery of electrical power to the heating element from the battery; a second microcontroller with capability to control delivery of electrical power to the heating element from the battery; and a communications path between the first microcontroller and the second microcontroller, wherein one or both microcontrollers is configured to use the communications path to detect a fault in the capability of the other microcontroller to control the delivery of electrical power to the heating element from the battery, and in response to detecting a fault, assuming control of the delivery of electrical power to the heating element from the battery.

According to a seventh aspect of certain embodiments, there is provided a control circuit for a vapor provision system comprising: a first controller with capability to control a first subset of components in the vapor provision system; a second controller with capability to control a second subset of components in the vapor provision system, at least one component in the second subset being also in the first subset; and a communication link between the first controller and the second; wherein each controller is operable to, via the communication link, detect a fault with the capability of the other controller to control the at least one component and, in response, assume control of the at least one component.

These and further aspects of certain embodiments are set out in the appended independent and dependent claims. It will be appreciated that features of the dependent claims may be combined with each other and features of the independent claims in combinations other than those explicitly set out in the claims. Furthermore, the approach described herein is not restricted to specific embodiments such as set out below, but includes and contemplates any appropriate combinations of features presented herein. For example, a control circuit or vapor provision device may be provided in accordance with approaches described herein which includes any one or more of the various features described below as appropriate.

BRIEF DESCRIPTION OF THE DRAWINGS

Various embodiments will now be described in detail by way of example only with reference to the accompanying drawings in which.

DETAILED DESCRIPTION

Aspects and features of certain examples and embodiments are discussed/described herein. Some aspects and features of certain examples and embodiments may be implemented conventionally and these are not discussed/described in detail in the interests of brevity. It will thus be appreciated that aspects and features of apparatus and methods discussed herein which are not described in detail may be implemented in accordance with any conventional techniques for implementing such aspects and features.

As described above, the present disclosure relates to (but is not limited to) aerosol provision systems, such as e-cigarettes. Throughout the following description the terms "e-cigarette" and "electronic cigarette" may sometimes be used; however, it will be appreciated these terms may be used interchangeably with aerosol (vapor) provision system or device. Similarly, "aerosol" may be used interchangeably with "vapor".

Figure 1:
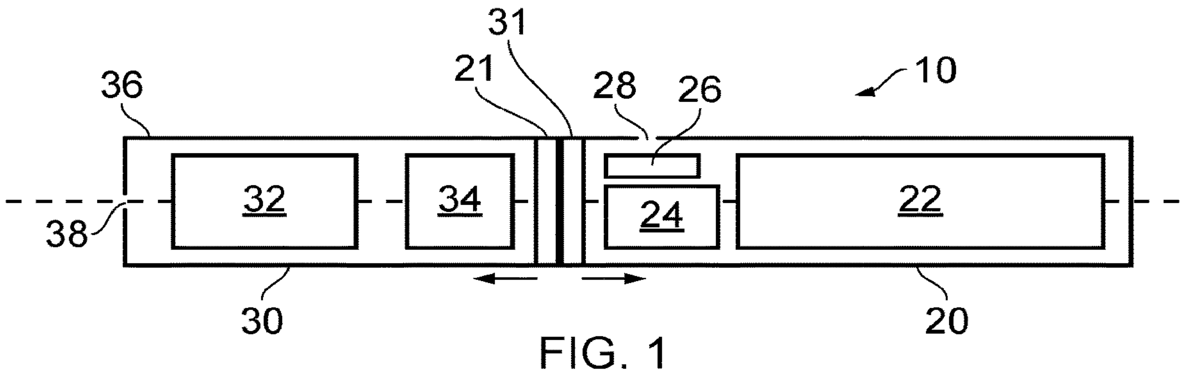
FIG. 1 shows a simplified schematic cross-sectional view of an example electronic cigarette or vapor provision device.

FIG. 1 is a highly schematic diagram (not to scale) of an example aerosol/vapor provision system such as an e-cigarette 10. The e-cigarette 10 has a generally cylindrical shape, extending along a longitudinal axis indicated by a dashed line, and comprises two main components, namely a control component or section 20 and a cartridge assembly or section 30 (sometimes referred to as a cartomizer).

The cartridge assembly 30 includes a reservoir 32 containing a source liquid comprising a liquid formulation from which an aerosol is to be generated, for example containing nicotine. As an example, the source liquid may comprise around 1 to 3% nicotine and 50% glycerol, with the remainder comprising roughly equal measures of water and propylene glycol, and possibly also comprising other components, such as flavorings. The cartridge assembly 30 also comprises an electrical heating element or heater 34 for generating the aerosol by vaporization of the source liquid by heating. An arrangement such as a wick or other porous element (not shown) may be provided to deliver portions of source liquid from the reservoir 32 to the heater 34. A heater and wick (or similar) combination is sometimes referred to as an atomizer, and the source liquid and the atomizer may be collectively referred to as an aerosol source. The cartridge assembly 30 further includes a mouthpiece 36 having an opening or air outlet 38 through which a user may inhale the aerosol generated by the heater 34.

The control section 20 includes a re-chargeable cell or battery 22 (referred to herein after as a battery) to provide power for electrical components of the e-cigarette 10, in particular the heater 34. Additionally, there is a printed circuit board (PCB) 24 and/or other electronics for generally controlling the e-cigarette 10. The general terms "circuitry", "circuit", "control circuitry", "control circuit" or "controller" will be used to refer to this component or group of components, and should be understood to include any arrangement and grouping of hardware, software and/or firmware configured to control the operation of various electronic and electrical components within the vapor provision system 10, including the control of electrical power from the battery 22 to the components. This control may include switching the electrical power supply on and off as well as regulating or modifying the electrical power level while it is switched on. The controller 24 may comprise one or more microcontrollers and/or microprocessors, for example. Also included is an air pressure sensor or air flow sensor 26 which can detect an inhalation on the system 10 during which air enters through one or more air inlets 28 in the wall of the control section 20. The sensor 26 provides output signals to the controller 24.

In use, when the heating element 34 receives power from the battery 22, as controlled by the controller 24 in response to pressure changes detected by the sensor 26 (not shown), the heating element 34 vaporizes source liquid delivered from the reservoir 32 to generate the aerosol, and this is then inhaled by a user through the opening 38 in the mouthpiece 36. The aerosol is carried from the aerosol source to the mouthpiece 36 along an air channel (not shown) that connects the air inlet 28 to the aerosol source to the air outlet 38 when a user inhales on the mouthpiece 36.

In this particular example, the control section 20 and the cartridge assembly 30 are separate parts detachable from one another by separation in a direction parallel to the longitudinal axis, as indicated by the arrows in FIG. 1. The parts 20, 30 are joined together (as illustrated) when the device 10 is in use by cooperating engagement elements 21, 31 (for example, a screw or bayonet fitting) which provide mechanical and electrical connectivity between the control section 20 and the cartridge assembly 30. An electrical connector interface on the control section 20 used to connect to the cartridge assembly 30 may also serve as an interface for connecting the control section 20 to a charging device (not shown) when the control section 20 is detached from the cartridge assembly 30. The other end of the charging device can be plugged into an external power supply, for example a USB socket, to charge or to re-charge the battery 22 in the control section 20 of the e-cigarette 10. In other implementations, a separate charging interface may be provided, for example so the battery 22 can be charged when still connected to the cartridge assembly 30.

This is merely an example arrangement, however, and the various components may be differently distributed between the control section 20 and the cartridge assembly section 30. For example, the controller 24 may be in a different section from the battery 22. The two sections may connect together end-to-end in a longitudinal configuration as in FIG. 1, or in a different configuration such as a parallel, side-by-side arrangement. Either or both sections may be intended to be disposed of and replaced when exhausted (the reservoir is empty or the battery is flat, for example), or be intended for multiple uses enabled by actions such as refilling the reservoir and recharging the battery. Alternatively, the e-cigarette 10 may be a unitary device (disposable or refillable/rechargeable) that cannot be separated into two parts, in which case all components are comprised within a single body or housing. Embodiments of the present disclosure are applicable to any of these configurations and other configurations of which the skilled person will be aware.

Additionally, the e-cigarette 10 may include one or more additional electrical/electronic components. These may receive electrical power from the battery 22, and be under the control of the controller 24. The controller 24 may generate control signals and send them to a component, and/or receive signals such as measurements back from the component, or the controller 24 may have control of a switch which it can open or close to connect or disconnect a component to the battery 22, for example. These components may include one or more lights (such as light emitting diodes) that indicate operational states to the user (such as when the heater is on, or when the battery 22 is charging or charged), one or more timers that determine operational periods for components, temperature sensors for safety purposes and/or to monitor operation of the heater, and components for regulating the voltage or current supplied to the heater 34. This list is an example only, and the electronic cigarette 10 may include none, fewer or all of these components, or other components. Embodiments of the present disclosure are applicable to any and all combinations of controllable components.

If the controller 24 (in the FIG. 1 example) is a single controller responsible for controlling the operation of all components within the electronic cigarette 10, problems may arise in the event of a fault with or failure of the controller 24. If the electronic cigarette 10 is simply rendered inoperable by the fault, this is inconvenient for the user. Other faults have more serious consequences, however. As a particular example, consider the heater 34. The controller 24 is configured to control the heater 34 by switching it on and off by connecting it to and disconnecting it from the battery 22. During the switched on time, the power level may be adjusted or modified, for example by regulating the current or voltage. The power is switched off in response to a particular event, which may vary according to the configuration of the electronic cigarette 10, but may be, for example, expiry of a timer or a drop in air flow detected by the sensor 26. The timer or sensor 26 communicate the event to the controller 24, which acts to disconnect the heater 34 from the battery 22. However, if the controller 24 develops an operational fault (which may be complete or partial failure of the controller 24) while the heater 34 is connected to the battery 22, the controller may not be able to disconnect the battery 22 from the heater 34 at the appropriate time. Power will continue to be provided to the heater 34, and the electronic cigarette 10 may become overheated, possibly posing a danger to the user. As another example, indicator lights that indicate a charge state of the battery 22 may not be switched on or off at the appropriate time so that false information is provided to the user who is unable to determine if the battery 22 is charged or not.

Examples of the present disclosure propose to address this issue by providing an additional controller able to assume control of a component, such as the heater, in the event of a fault that interrupts the first controller's ability to control that component. The controllers are both configured to be able to control the component if required, and are further configured to communicate with one another (to a greater or lesser extent depending on the implementation), and by this means, the second controller will be able to identify when a failure or fault of the first controller occurs, and take over control. The opposite arrangement may also be enabled if desired, so that the first controller is able to identify if a fault or failure of the second controller occurs and take over control from it. For both one-way and two-way monitoring and control take-over, the risk of a component being left in either an on or off state and not able to be switched to the other state is reduced or removed. Operation and control of any other components may be divided between the two controllers as desired, or attributed to one controller only. The two controllers together may be considered as a control circuit or control circuitry, and may be embodied as two microcontrollers or microprocessors, on a single printed circuit board or on separate boards, for example. Other configurations of hardware, software and firmware are not excluded, however.

Control of a component should be understood as encompassing any and all actions and functions required to produce operation of that component. This includes any or all of providing power to the component (which may or may not be by opening and closing a switch), sending control signals to the component, and receiving control and measurement signals from the component. A controller may be configured to, or provided with the capability to, control a component by being provided with suitable computer programming stored in memory for execution by a processor, or by appropriate hardware including wiring and logic gates for example, or a combination of hardware and software, or any other suitable technique according to the preference of the manufacturer and the type of controller used. The two controllers may of the same type or may each be a different type.

Figure 2:
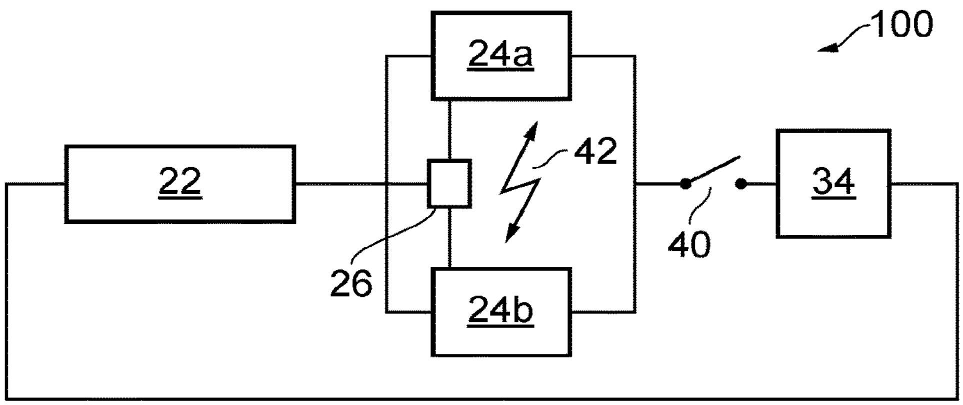
FIG. 2 shows a first example circuit diagram for providing control functionality in an electronic cigarette.

FIG. 2 shows a simplified circuit diagram of an example embodiment of control circuitry 100 comprising two controllers. A first controller 24*a* and a second controller 24*b* are provided, each arranged to receive electrical power from a battery 22. A heater 34 is connected to both the first controller 24*a* and the second controller 24*b* by way of a single switch 40. Each of the first controller 24*a* and the second controller 24*b* are configured (for example, by suitable programming) to control operation of the heater 34. An air flow sensor 26 is also included and connected so as to be able to provide signals representing the air flow measurements to both of the controllers 24*a*, 24*b*. When a predetermined level of airflow is detected, the heater 34 is required to operate, and either controller 24*a*, 24*b* can close the switch 40 so that electrical power can be delivered from the battery 22 to the heater 34, and then open the switch 40 when operation of the heater 34 is complete.

A communication link or communication path 42 is provided between the controllers 24*a*, 24*b*. This may be a wireless link or a wired link, and communications may be effected via any convenient protocol, such as an I2C (inter-integrated circuit) bus, a SPI (serial peripheral interface) bus, or a UART (universal asynchronous receiver/transmitter). The disclosure is not limited in this regard. The controllers 24*a*, 24*b* are configured to monitor each other's operation using the communication link 42. Alternatively, only the second controller 24*b* is configured to monitor the operation of the first controller 24*a*, or vice versa.

In normal operation, one of the controllers, say the first controller 24*a*, is designated to have operational control of the heater 34, and therefore acts to open and close the switch 40 in response to airflow measurement signals from the sensor 26. (Note that the airflow sensor is merely an example and other mechanisms may be utilized to activate operation of the heater, such as a user-operated switch on the e-cigarette outer housing.) The second controller 24*b* has no responsibility for controlling the heater 34. Instead, the second controller 24*b* uses the communications link 42 to monitor the operation of the first controller 24*a*. If the second controller 24*b* detects an inability of the first controller 24*a* to continue to control the heater 34, the second controller assumes control of the heater 40 by becoming responsible for operating the switch 40. The inability may be a fault in the first controller 24*a* that makes the first controller 24*a* specifically unable to continue control of the heater 34, or a complete failure of the first controller 24*a* that makes the first controller 24*a* wholly or largely inoperable. The inability may be detected by the second controller 24*b* operating to interrogate (perhaps periodically) the first controller 24*a*, so that the second controller 24*b* actively detects the fault and the first controller 24*a* is passive in the fault detection. Alternatively, the first controller 24*a* may be configured to send a fault notification to the second controller 24*a* to alert the second controller 24*a* to the occurrence of the fault, so that the first controller 24*a* is active in the fault detection while the second controller 24*b* is passive. Alternatively, a combination of these approaches might be used.

FIG. 2 shows an example arrangement only, and the circuit may be configured differently while providing the same functionality of a second controller assuming control of a component in the event of a fault in a first controller previously responsible for the component. For example, each controller may have its own associated switch for controlling the heater, while being able to operate the other controller's switch if necessary. FIG. 2 shows a shared air flow/pressure sensor, but each controller may have its own associated sensor. The controllers need not be arranged between the battery and the heater in series, but may be positioned in an arrangement parallel to the other parts so that current can reach the heater without passing via the controllers. Other modifications will be readily apparent to the skilled person.

Figure 3:
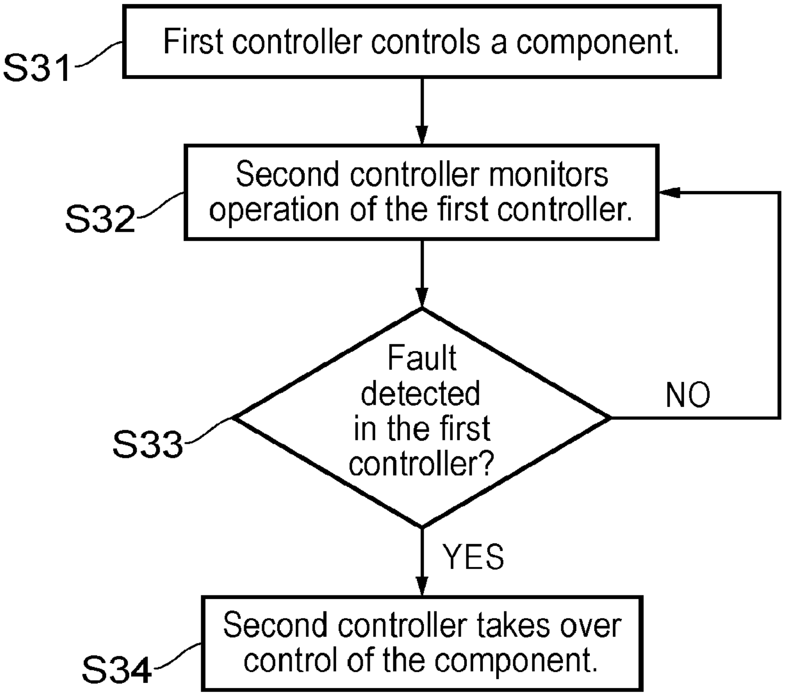
FIG. 3 shows a flow chart of a first example method for controlling component operation in an electronic cigarette.

FIG. 3 shows a flow chart illustrating an example method of controlling a heater (or other component) using two controllers. In S31, a first controller has responsibility to control a component in the vapor provision system, such as a heater, and operates to control it. In S32, a second controller monitors operation of the first controller while the first controller controls the component (in the meantime, any other components are being controlled by one or other of the first and second controllers). The method advances to a decision at S33, in which it is determined whether the second controller has detected a fault in the first controller's operation. If no fault has been detected, the method continues with the monitoring in S32. If, on the other hand, a fault is detected in the decision S33, the second controller takes over control of the component from the first controller in S34. The monitoring in S32 can be unidirectional as described, or can be carried on in both directions so that each controller monitors the operation of the other and each is poised to assume control in S34 in the event of detecting a fault in the other.

The circuit shown in FIG. 2 is a simple example that does not include electrical connectivity within other parts of the vapor provision system. Typically, the system will comprise additional electrical/electronic components operated and/or managed by controller control, such as the indicator lights, temperature sensor, timer, regulators and battery charging means already mentioned, and/or other components as desired. With two controllers being included, options are available for how to manage control of all the various components.

Consider these components as a set of components requiring control. As a first example, both controllers may be configured to be operable to control all components in the set. In other words, the first controller and the second controller are identical, and either could control all the components if required. In regular operation of the vapor provision system, control of each component can be assigned to one or other of the controllers. Hence, each controller performs a different set of control functions (a subset of the full set of components), but each has capability to perform the full set of control functions. Then, in the event of a fault or failure in a first of the controllers, the second controller can assume responsibility for the control functions that the first controller can not longer perform. This might be control of all the components in the set of the first controller if the first controller has failed completely, or might be control of just one or a few components if the first controller has a fault but is still partially operational. This configuration can be considered as a fully redundant configuration; during normal operation, a full set of control capabilities is redundant since all capabilities are duplicated across the two controllers. It offers the advantage that any fault in the control capability of one controller can be addressed by passing control to the other controller, so that normal operation of the vapor provision system can continue. However, it is a more costly configuration, since two controllers with full and identical functionalities are provided.

Figure 4:
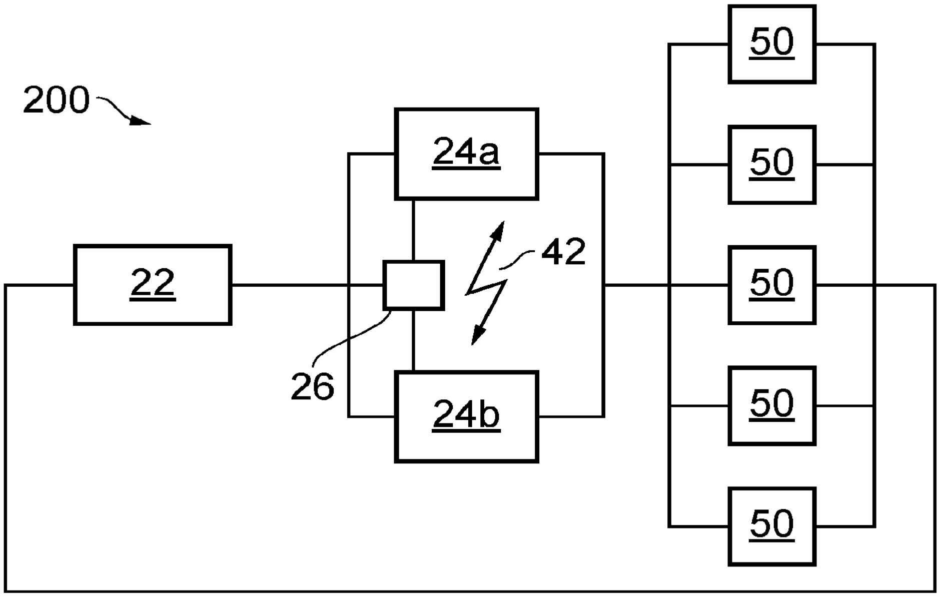
FIG. 4 shows a second example circuit diagram for providing control functionality in an electronic cigarette.

FIG. 4 shows a simplified circuit diagram of an example fully redundant configuration of circuitry 200. A plurality of components 50 is included, and each is able to be controlled by either of the controllers 24*a*, 24*b*. Switches are omitted for clarity; not all components will need switch control. During normal operation, the components 50 will be shared between the two controllers 24*a*, 24*b*, but if necessary, control of any or all the components 50 can be placed with a single controller in the event of a fault with the other controller. The components 50 can be shared equally or unequally between the two controllers 24*a*, 24*b*.

An alternative example is an arrangement in which the set of components is divided into two, each of which can be thought of as a subset, being the set of components for one controller, and each controller is configured only for control capability of the components in one subset. One or more components, such as the heater, are included in both subsets, so that they or it can be controlled by either controller if required, but otherwise, each component is able to be controlled by only one of the controllers. In an extreme example, the first controller may be configured to control all components, and the second controller is configured for control of one component only, such as the heater. The controllers are therefore different, with duplication of capabilities confined to one or a few components only. The configuration is partially redundant, and in normal operation, the control functions are shared between the two controllers. This is a cost-effective approach in that each controller only needs to be provided with functionality to control some of the components, so that each has a reduced specification (programming and computing power) compared to a controller able to control all the components. However, not all faults will be able to be addressed by passing control away from a failed controller, so the vapor provision system may become inoperable in the event of certain faults. Nevertheless, potentially dangerous faults such as the heater control issue discussed above can be addressed if components likely to produce unsafe conditions are included in both subsets of the components.

Figure 5:
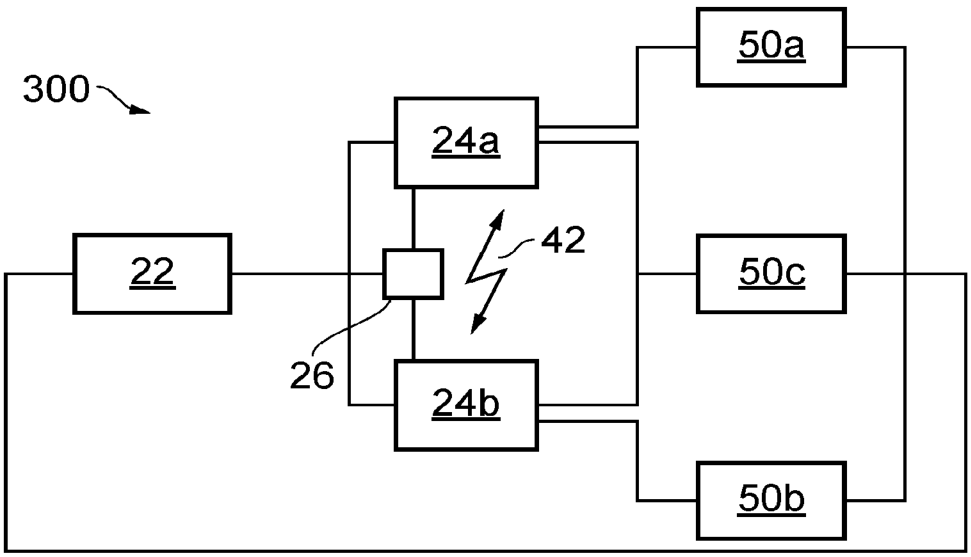
FIG. 5 shows a third example circuit diagram for providing control functionality in an electronic cigarette.

FIG. 5 shows a simplified circuit diagram of an example partially redundant configuration. The components are divided into two subsets 50*a* and 50*b* (each shown as a single entity for simplicity). A first controller 24*a* is configured to control the first component subset 50*a*, and a second controller 24*b* is configured to control the second component subset 50*b*. A third group of components 50*c* (which may be a single component, such as a heater, or more than one component) belongs to both subsets in that both controllers 24*a* and 24*b* are configured to control the components 50*c*, although in normal operation, each component in the third group will be allocated to be controlled by one or other of the controllers 24*a*, 24*b* only.

In general, the second controller takes over control of a component from the first control if the second controller detects that a fault or failure of the first controller that affects the first controller's ability to control the component has occurred. There are a range of options for implementing this takeover and determining what actions occur after the takeover. Considering the FIG. 3 example, for instance, there are alternatives following S34.

Figure 6:
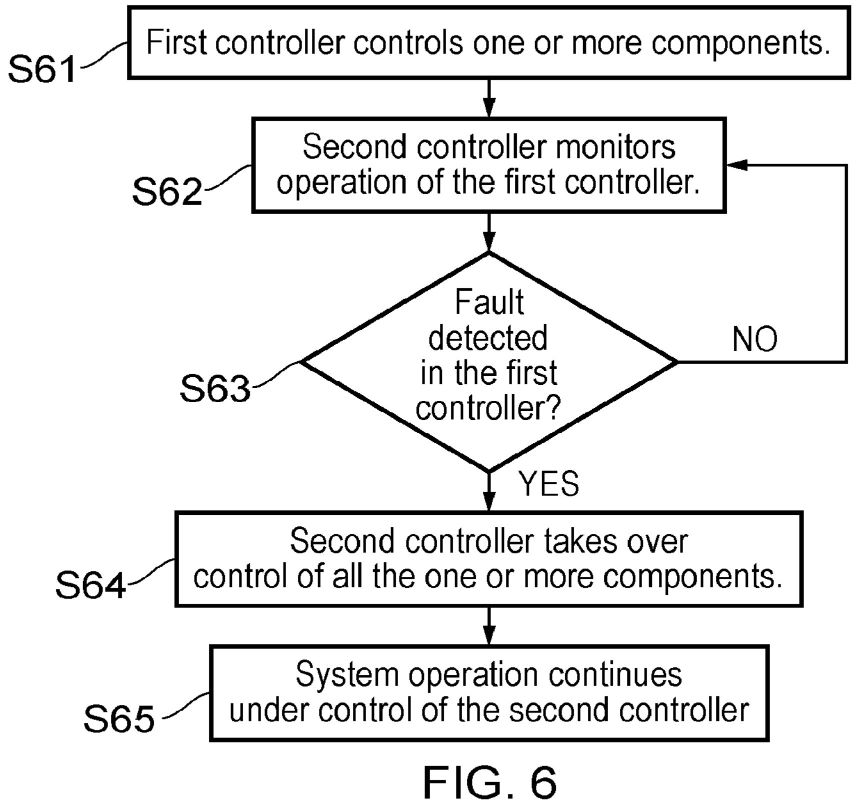
FIG. 6 shows a flow chart of a second example method for controlling component operation in an electronic cigarette.

FIG. 6 shows a flow chart of an example method according to one embodiment. This method is applicable to devices with full redundancy, in which both controllers have capability to control every component. In S61, the first controller operates to control one or more components. In 62, the second controller monitors the operation of the first controller (while also controlling other components itself, and being monitored in turn by the first controller). Next is a decision at S63 in which it is determined whether the second controller has detected a fault in the operation of the first controller. The fault may be a complete failure of the first controller, or a fault in its ability to control one or more individual components only. If no fault, the monitoring in S62 continues. If a fault is detected, the method proceeds to S64 in which the second controller takes over control of all of the one or more components from the first controller. Then, in S65, the vapor provision system continues operation under the sole control of the second controller. This arrangement prolongs the life of the device compared to a device with one controller that may develop a fault, but the improved safety offered by the use of two controllers (ability to take over and switch off the heater, for example) is lost once one of the controllers has failed.

Figure 7:
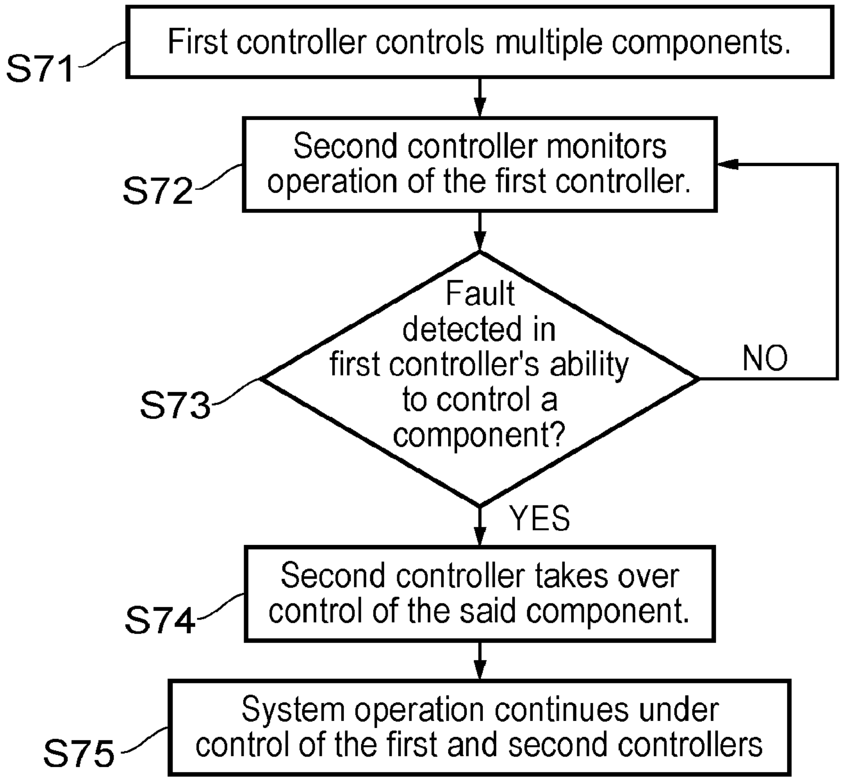
FIG. 7 shows a flow chart of a third example method for controlling component operation in an electronic cigarette

FIG. 7 shows a flow chart of an example method according to an alternative embodiment. In S71, the first controller operates to control multiple (two or more) components. The second controller monitors operation of the first controller in S72 (while also controlling other components itself, and being monitored in turn by the first controller), and the method continues to a decision in S73, where it is determined whether there is a fault in the first component's ability to control a particular component out of those multiple components for which it is responsible. If there is no fault, the monitoring continues in S72. If a fault is detected, the second controller assumes control of the said component from the first component, while the first controller carries on control of any other components for which it is responsible. Operation of the vapor provision system then continues in S75 under control of the first and second controllers. The method differs at its end from its start by the transfer of control for one component having been passed from one controller to the other, while other control functions continue as before. This method can be implemented in either a fully redundant system, in which the second controller is able to take over control of any component previously under the control of the first controller, or in a partially redundant system in which the second controller can take over control of only one or a few components (those in group 50*c* in FIG. 5, for example) for which both controllers have control operability. In the former case, continued operation of the device is preserved for any fault, as in the FIG. 6 example. In the latter case, continued operation can be achieved for only some faults in the first controller's control operation.

Figure 8:
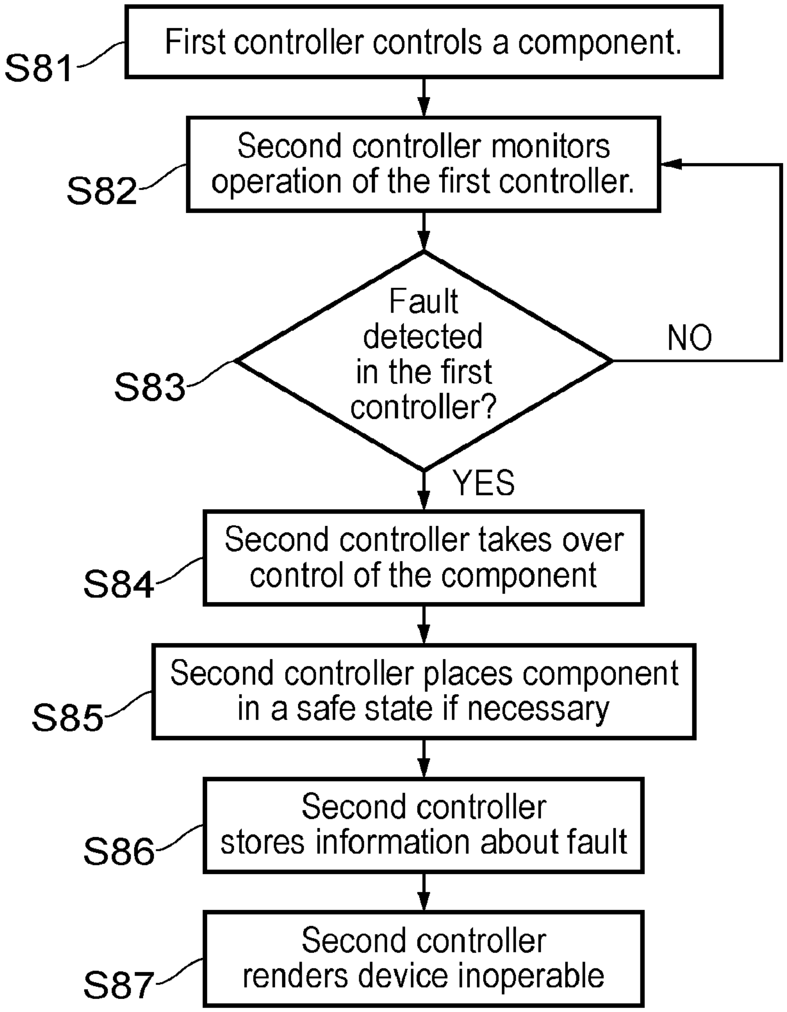
FIG. 8 shows a flow chart of a fourth example method for controlling component operation in an electronic cigarette.

FIG. 8 shows a flow chart of an example method according to another alternative embodiment. In S81, the first controller controls a component (and possibly other components). During this control, in S82, the second controller monitors the operation of the first controller to check for faults (while also controlling other components itself, and being monitored in turn by the first controller). At the decision in S83, it is determined whether a fault has occurred in the operation of the first controller such that it cannot control the component any longer. The fault may be a general failure of the first controller, or a particular fault or error in its ability to control that component alone. If there is no fault, the second controller continues monitoring in S82. If there is a fault, the method passes to S84, in which the second controller takes over control of the component from the first controller. Then, in S85, the second controller places the component in a safe condition if this is necessary. For example, if the fault has meant that the first controller was not able to turn off the heater, so that it remains on, the second controller acts to switch the heater off, to render it safe and not liable to overheat the vapor provision device as a whole. Other components might need to be switched off or switched on to render them safe, depending on their function. If however, the fault is that the first controller cannot turn the heater on in the first place, the second controller can assume control for it, but it is already in a safe state and can be left in that condition, so no action is required in S85. In S86, the second controller optionally stores information about the fault, either in memory of its own or memory elsewhere in the device to which it has access, before proceeding to S87, in which it renders the device inoperable. This might require that the second controller takes over control of all components from the first controller, depending on the number of components and their configuration. Alternatively, a master switch might be provided which is accessible to both controllers, so that a surviving controller can operate the switch to, for example, cut the power supply to all components and put the device into a sleep mode or other inert condition. Other procedures to induce inoperability may also be used. Once this has occurred, the user could return the device to the manufacturer for repair or replacement, and the manufacturer can retrieve the stored fault information to aid the repair and/or log the incidence of faults for design improvement or product recall purposes. S84, S85 and S86 can take place in orders other than illustrated, and some may be omitted if desired.

The FIG. 8 example is concerned more with safety than with preserving operation after the development of a fault. Therefore, the various alternatives of FIGS. 6, 7 and 8 can be selected according to which and how many components it is deemed appropriate to duplicate between the controllers. As a minimum, duplicating control of the heater offers the safety benefits explained above, and this can be extended to less hazardous components and further to those components whose faulty control is merely inconvenient, depending on the degree of redundancy that can be tolerated.

Although the above description has often been expressed in terms of the first controller developing a fault, and the second controller detecting the fault and taking over control functions from the first controller, this has been for convenience only. In reality, each controller can have the ability to monitor the operation of the other, and each can assume control from the other as required in the event of a fault or failure. Alternatively, a configuration in which a second controller is provided primarily to take over control of one or more components if necessary without any significant control functions of its own, so that there is no need for the first controller to perform monitoring and the takeover capability is from the first to the second controller only, can also be implemented if desired.

The format and functioning of the communications link (channel or path) between the controllers can be chosen according to the required operation. If both controllers are capable of controlling several components and it is expected that the control functions will be shared between the controllers in normal operation, it is desirable that each controller can monitor operation of the other. In this situation, a relatively sophisticated link may be provided that allows full two-way communications, with both parties able to initiate and receive requests and queries, and formulate and send responses, and otherwise exchange information (measurements, control signals and the like) as required. In simpler examples, such as where the second controller is provided only to take over control in the event of failure of the first controller, the monitoring ability can be one-way only since there is no need for the first controller to monitor the second controller. Detailed communication exchanges are not required in this case; it is merely necessary for the second controller to be able to monitor (or watch) the first controller. For both one-way and two-way monitoring, detailed communications may be employed, or a simple polling technique might be considered sufficient. For example, the monitoring controller may interrogate the monitored controller by sending regular (periodic or not) polling queries to the monitored controller to check its operational status, and wait for a response. The monitored controller may send a reply to a query only if its operational status is good, so that a fault will be detected if the monitoring controller notes that no reply has been received to a recent query (or two or more consecutive queries to correct for an occasional error). Alternatively, the monitored controller may be able to formulate and send a reply indicating that its operational status is not good, and receipt of such a reply allows the monitoring controller to detect a fault. Alternatively, the monitored controller may be able to send a message reporting a fault to the monitoring controller independently of any polling query received from the monitoring controller, so that receipt of such a message allows the monitoring controller to detect a fault. Other fault detection techniques utilizing the sending and/or receipt of messages between two controllers will be apparent to the skilled person; and can be employed as desired. As a further alternative, the monitoring controller may simply observe operation of the monitored controller via a connection or link, such as by checking for expected output control signals intended for a component of interest. Expected signals might be observed directly, or may trigger the sending of a signal or message to the monitoring controller. An absence of expected signals or a deviation from an expected pattern of signals could be interpreted as an operational fault in the monitored controller. Any communication arrangement configured to enable these techniques can be utilized; the terms "communication link", "communication channel", "communication path", "connection" and the like are intended to cover all suitable alternatives, and do not necessarily imply the use of a full two-way communication.

The control circuitry comprising the two controllers can be accommodated anywhere within an electronic cigarette, where the electronic cigarette itself may comprise separable components (such as a cartomizer and battery/power section) so that the circuitry may be in either component. Alternatively, the controllers may be placed one in each of two separable components. Often, however, an electronic cigarette comprises a disposable or refillable cartomizer connectable to a power/control section housing a rechargeable battery and a controller. Hence, in one embodiment, the control circuitry comprising two controllers is housed in a power section together with a battery where the power section is connectable to a cartomizer section housing an atomizer and a source liquid supply (reservoir or other liquid store).

The various embodiments described herein are presented only to assist in understanding and teaching the claimed features. These embodiments are provided as a representative sample of embodiments only, and are not exhaustive and/or exclusive. It is to be understood that advantages, embodiments, examples, functions, features, structures, and/or other aspects described herein are not to be considered limitations on the scope of the invention as defined by the claims or limitations on equivalents to the claims, and that other embodiments may be utilized and modifications may be made without departing from the scope of the claimed invention. Various embodiments of the invention may suitably comprise, consist of, or consist essentially of, appropriate combinations of the disclosed elements, components, features, parts, steps, means, etc., other than those specifically described herein. In addition, this disclosure may include other inventions not presently claimed, but which may be claimed in future.

The invention claimed is:

1. A control circuit for a vapor provision system, comprising:

a first controller with capability to control a first set of components in the vapor provision system;

a second controller with capability to control a second set of components in the vapor provision system, at least one component in the second set of components being also in the first set of components; and a communication link between the first controller and the second controller by which at least one controller can monitor operation of the other controller;

wherein one or both controllers are operable to, via the communication link, detect a fault with the capability of the other controller to control the at least one component and, in response, assume control of the at least one component, wherein a master switch is accessible to both controllers, such that one or both controllers is further configured to, in response to detecting said fault, cut power supply to all components of the first and second sets of components using the master switch.

2. The control circuit of claim 1, wherein the at least one component comprises an electrical heating element, and the capability to control the at least one component comprises controlling provision of electrical power from a battery to the heating element.

3. The control circuit of claim 2, wherein the fault comprises an inability of the other controller to discontinue provision of electrical power to the heating element.

4. The control circuit of claim 2, wherein the operability of one or both controllers to assume control of the at least one component comprises stopping the provision of electrical power to the heating element.

5. The control circuit of claim 1, wherein one or both controllers is further configured to, in response to detecting a fault with the other controller, place the vapor provision system in an inoperable state.

6. The control circuit of claim 1, wherein the first set of components and the second set of components are the same, and one or both controllers is further operable to, in response to detecting a fault with the other controller, assume control of all components in the first set and the second set.

7. The control circuit of claim 1, wherein monitoring operation of the other controller comprises sending polling queries to that controller via the communication link, and detecting a fault comprises noting an absence of a reply to a polling query or noting a reply to a polling query that reports a fault.

8. The control circuit of claim 1, wherein detecting a fault comprises noting a fault reporting message received via the communications link.

9. A vapor provision system comprising the control circuit of claim 1.

10. A control section for a vapor provision system, the control section housing the control circuit of claim 1 and a battery, the control section configured to be separably connectable with a cartomizer section, the cartomizer section and the control section together forming the vapor provision system.

11. A method of controlling a component in a vapor provision system, comprising:

controlling the component using a first controller;

monitoring operation of the first controller using a second controller for the purpose of detecting faults in the operation of the first controller via a communication link between the first controller and the second controller; and in response to detection by the second controller of a fault in the operation of the first controller, transferring control of the component to the second controller, wherein a master switch is accessible to both controllers, such that the second controller is further configured to, in response to detecting said fault, cut power supply to the component using the master switch.

12. The method of claim 11, in which the detected fault is any fault in operation of the first controller.

13. The method of claim 11, in which the detected fault is a fault in an ability of the first controller to control the component.

14. The method of claim 11, further comprising, in response to detection of the fault, the second controller placing the vapor provision system in an inoperable state.

15. An electronic vapor provision system or part therefore comprising:

an electrical heating element;

a battery;

a first microcontroller with capability to control delivery of electrical power to the heating element from the battery;

a second microcontroller with capability to control delivery of electrical power to the heating element from the battery; and a communications path between the first microcontroller and the second microcontroller;

wherein one or both microcontrollers is configured to use the communications path to detect a fault in the capability of the other microcontroller to control the delivery of electrical power to the heating element from the battery, and in response to detecting a fault, assume control of the delivery of electrical power to the heating element from the battery, wherein a master switch is accessible to both microcontrollers, such that one or both microcontrollers is further configured to, in response to detecting said fault, cut power supply using the master switch.

* * * * *